April 27, 1937.   L. OCHTMAN, JR   2,078,806
AUTOMATIC PLATE VALVE
Filed Sept. 28, 1934   5 Sheets-Sheet 1

INVENTOR
Leonard Ochtman
BY
ATTORNEY

April 27, 1937.  L. OCHTMAN, JR  2,078,806
AUTOMATIC PLATE VALVE
Filed Sept. 28, 1934   5 Sheets-Sheet 2

INVENTOR
Leonard Ochtman Jr.
BY
Louis Prevost Whitaker
ATTORNEY

April 27, 1937.  L. OCHTMAN, JR  2,078,806
AUTOMATIC PLATE VALVE
Filed Sept. 28, 1934  5 Sheets-Sheet 3

INVENTOR
Leonard Ochtman Jr.
BY
Louis Prevost Whitaker
ATTORNEY

April 27, 1937.　　　L. OCHTMAN, JR　　　2,078,806
AUTOMATIC PLATE VALVE
Filed Sept. 28, 1934　　　5 Sheets-Sheet 4

INVENTOR
Leonard Ochtman Jr.
BY
Louis Prevost Whitaker
ATTORNEY

April 27, 1937.　　　L. OCHTMAN, JR　　　2,078,806
AUTOMATIC PLATE VALVE
Filed Sept. 28, 1934　　　5 Sheets-Sheet 5

Leonard Ochtman Jr.
INVENTOR
BY Louis Keesan Whitaker
ATTORNEY

Patented Apr. 27, 1937

2,078,806

UNITED STATES PATENT OFFICE 2,078,806

AUTOMATIC PLATE VALVE

Leonard Ochtman, Jr., Bradford, Pa., assignor to S. R. Dresser Manufacturing Company, Bradford, Pa., a corporation of Pennsylvania Application September 28, 1934, Serial No. 745,837

9 Claims. (Cl. 277—46)

My invention consists in the novel features hereinafter described, reference being had to the accompanying drawings, which illustrate several embodiments of my invention, selected by me for purposes of illustration, and the said invention is fully disclosed in the following description and claims.

My invention consists of an automatic plate valve in which the valve member comprises a flat plate or strip of spring metal normally lying inert when in the closed position upon a flat seat provided in a seat member. The seat member is provided with a passage for each valve member, of which there may be any desired number, each passage being within the seat or portion of the seat, controlled by a single plate valve, and the plate valve members lying between the seat member and a keeper member rigidly secured with respect to the seat member and provided with passages in staggered relation to the passages of the seat member and provided with recesses above the plate valve members permitting the flexing of the valves away from their seats in the open position and limiting the extent of such flexing.

I am aware that automatic plate or strip valves have been previously proposed, in which the flat plate, free at both ends, opens by flexing away from its seat due to a difference in fluid pressure on its two sides, and assumes a curved shape when in the open position. To assume this curve the plate must be restrained against lifting at or near each of its ends, this restrainment being provided by the close approach of the recessed surface in the keeper to the plate at each end. The valve thus opens by flexing of the plate rather than by direct lift throughout its length, only sufficient clearance being provided between the plate and the ends of the recess in the keeper to permit freedom of movement.

A distinction must be made between two forms of valve of this type. In one form the keeper recess is so made that restrainment is at the extreme ends of the plate, which thus flexes entirely away from and above the seat. In the other form restrainment occurs a short distance in from each end of the plate, so that the extreme ends of the plate, from the lines of restrainment out, deflect towards the seat, which must therefore be provided with recesses to accommodate the ends of the plate and permit freedom of flexing.

In the first form mentioned, end restrainment of the plate is commonly provided by abutting surfaces in the keeper. In the second form, it has been proposed to provide individual recesses in both the lower surface of the keeper and the upper surface of the seat. To be effective, however, these recesses must be made with square corners, and the corresponding ones in the keeper and in the seat must match perfectly to prevent interference with the free flexing of the plate due to catching on projecting edges. This construction is very difficult to obtain in commercial manufacture, and is thus not practical.

The second form, however, has inherent advantages over the first, particularly when it is desired to operate the valve rapidly, as in high-speed compressors or blowers. When the plate flexes, it has longitudinal movement at its ends. With the line of restrainment at a little distance from the end of the plate, as in the second form, the movement causes sliding of the flat plate surface across that portion of the keeper which forms the restrainment. This is accomplished with little friction or wear. In the first form mentioned, sliding occurs at the extreme ends of the plate, which have a tendency to wear into the recesses in the keeper, due to gouging action in closing. This is intensified by manufacturing variations at the ends of the plates, which, it will be understood, do not affect the operation of valves of the second form. This second form thus operates with greater freedom and is preferably for high-speed machines.

While some of the features of my invention are intended to permit the practical manufacture of valves of the second form, they provide other advantages as well, and furthermore, are not limited to valves of that form. Such features may be just as readily provided in valves of the first form.

An important feature of my invention consists in the provision of independently removable keeper bars extending along opposite sides of the keeper adjacent to the end portions of the plate valve members, and preferably independently secured to the seat member in such a manner that they prevent endwise movement of the valve members in either direction. This construction greatly facilitates the assembly of the various parts of the valve mechanism as the keeper can be secured in position with respect to the seat member and the plate valve members can be slid into the spaces between the keeper and the seat member, after which the keeper bars may be secured in position. This construction facilitates the repair of the valve mechanism in case of the breakage of a plate valve member, as by the removal of one or both of the keeper bars, a broken plate valve member can be removed and replaced without disturbing the other parts of the mechanism. In some embodiments of my invention the keeper bars have portions extending into the recesses at opposite ends of the seat portion of the seat member and provide an abutting face extending below the plane of the seat portion of the seat member and forming in effect a continuous unbroken vertical end wall of the recess within which the projecting end portions of the plate valve members are accommodated and extending throughout the range of movement of the adjacent ends of the plate valves so that ends cannot catch against any portion of said wall when the valves are flexed.

Another feature of my invention resides in the provision of vertically disposed recesses in the inner faces of the keeper bars, the side walls of which embrace the end portions of the plate valve members, to hold the plate valve members against lateral displacement, while the inner wall of each of said recesses forms an abutting face to prevent the endwise movement of said plate valve members.

Another feature of my invention resides in the provision on the upper face of the seat member of a separate hardened seat plate, the upper face of which forms the actual seat portion of the seat member engaged by the plate valve or valves.

My invention also comprises certain novel features of construction and combination of parts hereinafter fully described and particularly pointed out in the claims.

Referring to the accompanying drawings, which illustrate several embodiments of my invention selected by me for purposes of illustrating the same.

Fig. 12 is a bottom plan view of the keeper shown in Figs. 8 and 9.

Fig. 13 is a view similar to Fig. 3, showing another slightly modified embodiment of my invention.

Fig. 14 is a similar sectional view showing still another modified embodiment of my invention.

Figure 1:
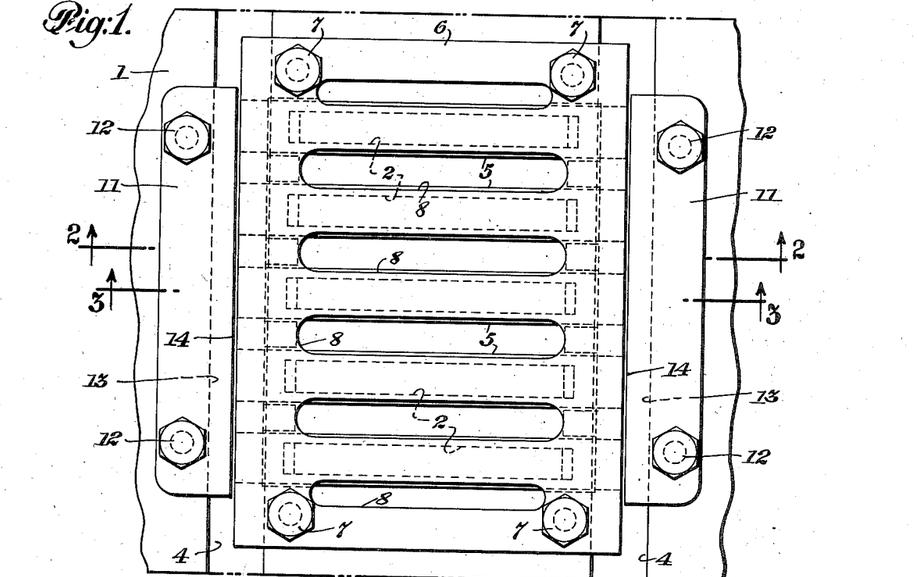
Fig. 1 is a plan view of a plate valve mechanism embodying my invention.
Figures 2, 3:
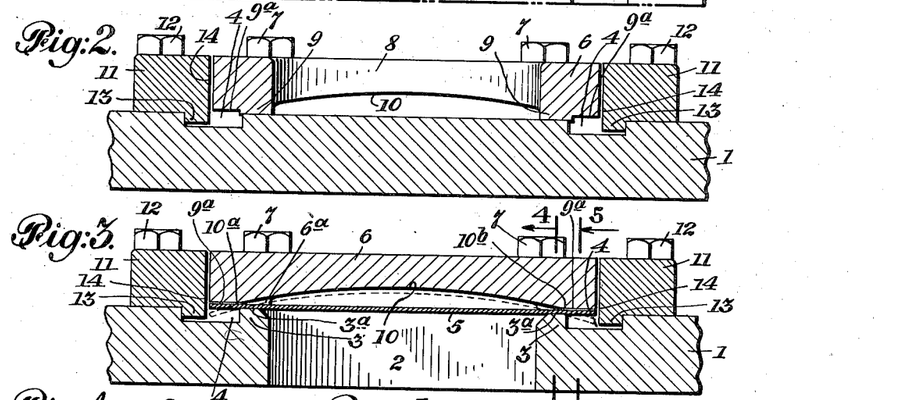
Fig. 2 is a transverse sectional view of the same on line 2—2 of Fig. 1, looking in the direction of the arrows, the section being taken through one of the passages in the keeper.
Fig. 3 is a similar section of Fig. 1, taken on the line 3—3 looking in the direction of the arrows, the line of section being through one of the plate valve members.
Figure 4:
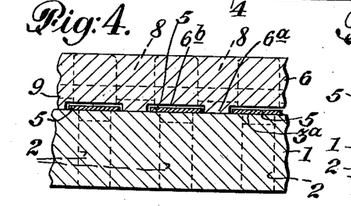
Fig. 4 represents a partial longitudinal section on the line 4—4 of Fig. 3, looking in the direction of the arrows, the passages in the seat member and in the keeper being indicated in dotted lines.
Figure 5:
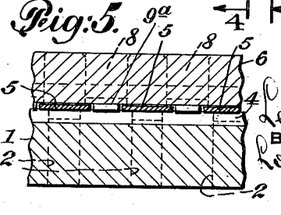
Fig. 5 is a similar section of Fig. 3 on line 5—5 looking in the direction of the arrows.
Figure 15:
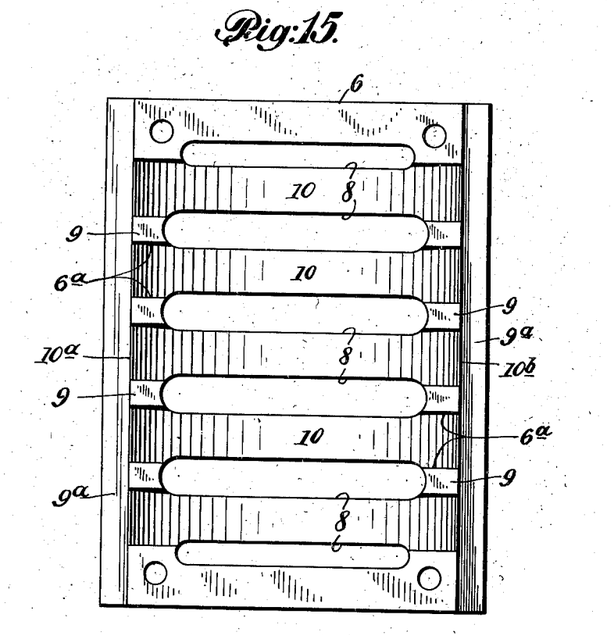
Fig. 15 is a bottom plan view of the keeper shown in Fig. 1.

Referring to the embodiment of my invention illustrated in Figs. 1 to 5 inclusive and Fig. 15, 1, represents the seat member, which is provided with a plurality of passages, 2, illustrated in dotted lines in Figs. 4 and 5, and one of which is shown in full lines in Fig. 3. The seat member, 1, is provided with a seat portion, 3, which in this instance is an integral part of the seat member and provides a seating surface, indicated at 3a, surrounding the inner ends of the passages, 2. While of course my invention may be embodied in a valve mechanism comprising only one plate valve member and a single passage controlled thereby, it is customary to use a plurality of plate valve members, each controlling a passage in the seat member, and it will be obvious that the valve engaging seat portions, 3a, of the seat member will be finished as a plain surface extending from one end of the seat member to the other, which facilitates joining to each other. Adjacent to opposite ends of the passages, 2, the seat member is provided with recesses, indicated at 4—4, extending beyond the ends of the keeper bars, the bottom of each of said recesses lying below the level of the valve engaging seat surface of the seat member, for the purpose of providing the recesses into which the projecting ends of the plate valve members may extend when the latter are flexed, as hereinafter described. I prefer to form these recesses as a continuous groove, or recess, 4, so that it may be the more readily planed or milled or otherwise formed, where, as in the case illustrated in Figs. 1 to 5, the seat portion of the seat member is integral therewith. The recess, 4, is, however, made of greater width, as shown, than necessary to accommodate the projecting ends of the plate valve member.

The plate valve members are indicated by the numeral 5, and as shown, they lie upon the valve engaging seating portions of the seat portion of the seat member directly over the respective passages, 2, the ends projecting a distance beyond the exterior edges of said seating surfaces. These valve members consist of strips of thin resilient metal and when lying inert upon the seating member, they completely close the passages, 2.

The keeper, indicated at 6, is in the form of a plate superimposed upon the seat member, 1, and rigidly secured with respect thereto, ordinarily by means of screws, indicated for example, at 7. The keeper is provided with a series of discharge passages, 8, indicated in full lines in Figs. 1 and 2 and in dotted lines in Figs. 4 and 5, the discharge passages, 8, being in staggered relation to the inlet apertures, 2, in the seat member, 1, as clearly shown in Figs. 4 and 5. The keeper is provided on its under face (see Fig. 15) with a longitudinally extending portion, 9, at each side for engaging the top face of the seat portion of the seat member and between these portions, 9, the keeper is provided with arched or upwardly curved portions, 10, extending above the portions of the plate valve members which engage the seating surface of the seat member, to permit the upward flexing of the valve members throughout a portion thereof between the opposite exterior edges of said seating surfaces. These upwardly curved or recessed portions, 10, are produced by forming individual recesses above and slightly wider than each plate valve member, said recesses terminating at each end at a point beyond the edges of the seating surface, but within the adjacent ends of the strips. It will be noted that the curved face, 10, extends as a continuous curve from a point in the lower face of the keeper at one side, as indicated at 10a, Fig. 3, to a corresponding point, 10b, in the lower face of the keeper at the other side thereof, which facilitates the milling or formation of these recesses on a single radius.

In the form of my invention illustrated in Figs. 1 to 5 and Fig. 15, the plate valve members are held from lateral displacement by spacing and guiding portions of the keeper, indicated at 6a, between recesses, 6b, formed in the portions, 9, of the keeper, as indicated in Fig. 4. Each of these longitudinal portions, 9, of the keeper, has a face, 9a, which projects laterally over the adjacent recess, 4, in the seat member, said face, 9a, being enough above the plane of the seating surface to permit the strip valve or valves to fit in between with working clearance. These slightly raised portions of the under side of the keeper are formed by milling a continuous recess along each of the two sides of the keeper, and the intersections of the curved recess, 10, with the faces, 9a, form the fulcrums about which the strip valve flexes. For the purpose of preventing longitudinal displacement of the plate valve members, I provide on each side of the keeper a keeper bar, said bars being indicated at 11, 11. Each of said keeper bars is independently secured in fixed relation with the keeper, 6, and seat member, 1, usually, as shown in Figs. 1, 2 and 3, by means of screws, 12, passing through the keeper bars and extending into the seat member. Each keeper bar is provided adjacent to its inner edge with a downwardly extending portion, 13, which extends below the level of the valve engaging seating surface, 3a, of the seat member. These portions, 13, extend into the recesses, 4, as shown in Figs. 2 and 3. Each of the keeper bars thus provides on its inner face an unbroken abutting face, 14, portions of which lie adjacent to the contiguous ends of each of the plate valve members when in their closed position and extend below the ends of said valve, so that these abutting faces will effectually prevent any endwise movement of the plate valve members with respect to the seat member and keeper and will not present brake, interruption or projection on which the ends of the valves can catch when the valves are flexed.

As previously stated this construction provides great advantages in assembling the parts of the valve mechanism, as the keeper may be placed in position upon the seat member and secured thereto, one of the keeper bars can then be secured in position, and the plate valve members or strips may be then slid lengthwise into position, after which the remaining keeper bar is secured in place. This construction also permits the easy removal of a broken strip or plate valve member and its replacement with a perfect one merely by removing one keeper bar and sliding the damaged strip or plate valve out, inserting the new strip or plate valve member, and again securing the removed keeper bar in place. Of course both keeper bars may be removed if it is necessary to dislodge a broken piece of a valve member, but that will not ordinarily be necessary.

Figure 6:
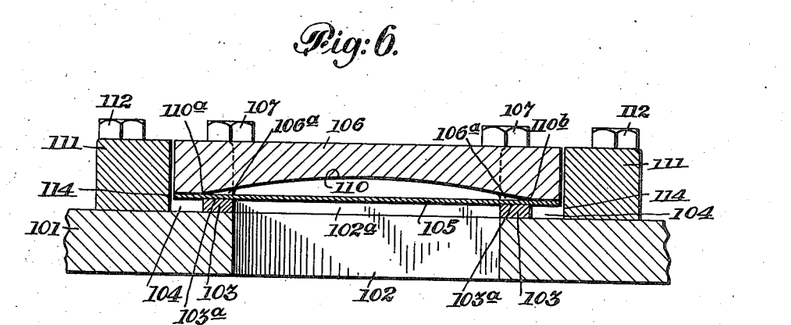
Fig. 6 is a sectional view similar to Fig. 3, illustrating a modification in which the seat portions of the seat member are formed on the outer face of a separate hardened seat plate secured to the seat member.
Figure 7:
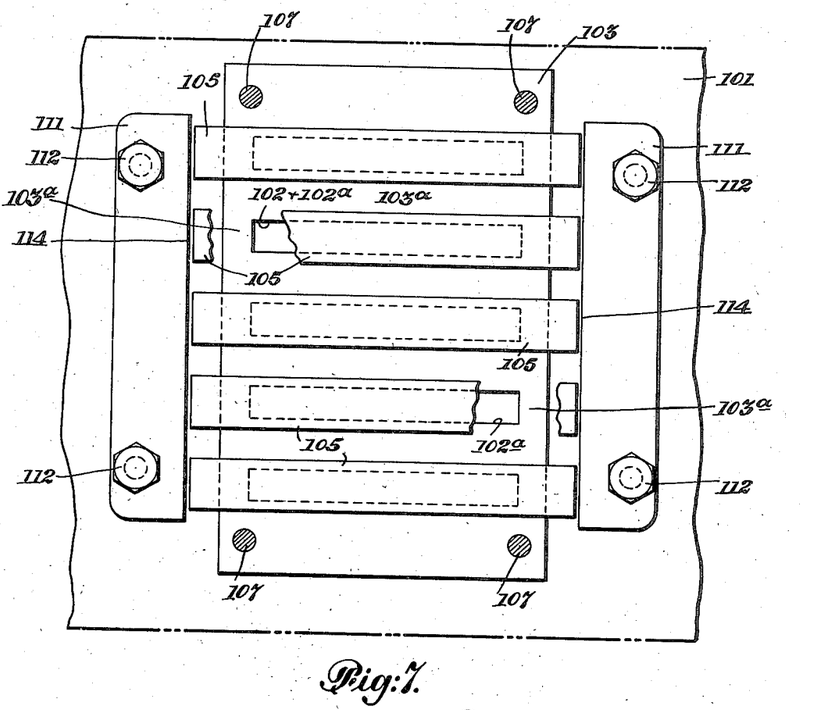
Fig. 7 is a top plan view of a valve mechanism of the form shown in Fig. 6, with the keeper removed and portions of certain of the plate valve members broken away.
Figure 8:
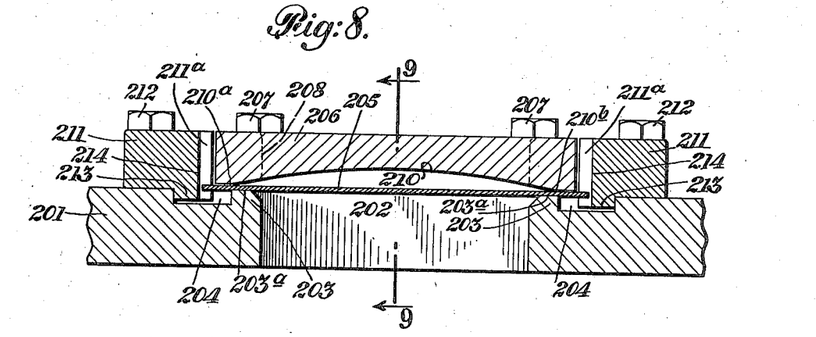
Fig. 8 is a sectional view similar to Fig. 3, showing another modified form of my invention in which the keeper bars are provided with recesses for engaging the projecting end portions of the plate valve members, to prevent lateral displacement thereof.
Figure 9:
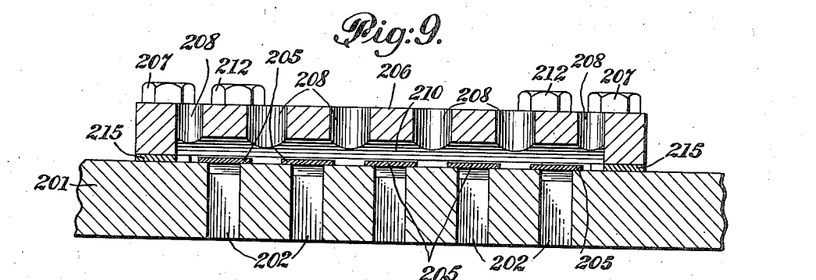
Fig. 9 is a longitudinal section on line 9—9 of Fig. 8.
Figure 10:
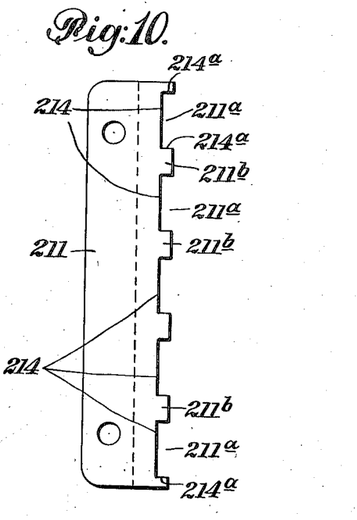
Fig. 10 is a detail view of one of the keeper bars illustrated in Fig. 8.

In Figs. 6 and 7 I have illustrated a slightly modified embodiment of my invention, in which the corresponding parts to those shown in Figs. 1 to 5 inclusive, and 15, are given the same reference numerals with the addition of 100, to avoid repetition. In this embodiment, the seat member, 101, is provided with a separate seat portion, 103, formed of hardened material, the upper face of which is ground or otherwise suitably prepared to provide the valve engaging seating surface, 103a. This separate seat portion, 103, is held in place between the seat member, which is provided with a plain upper surface, to receive the seat, and the keeper, and may be secured in position by the same screws, 107, which hold the keeper in position. The separate seat portion, 103, is of course provided with slots or passages, 102a, registering with the inlet passages, 102, in the seat member, as clearly indicated in the drawings. The separate seat portion, 103, is also made of less width than the length of the plate valve members, and of sufficient thickness to permit the downward movement of the projecting end portions of the valve members, and the keeper bars, 111, may thus be made rectangular in cross section and secured directly to the upper face of the seat member without any downwardly extending portion such as previously described, thereby defining the recesses at each side of the seat portion, 103, between the lateral edges of the seat portion, the top face of the seat member and the unbroken abutting face, 114, of the adjacent keeper bars which extends below the plane of the seating surface in position to engage the adjacent ends of the plate valves.

With this construction, the operation will be the same as with the construction illustrated in Figs. 1 to 5 and 15, but obviously should the valve engaging seating surface of the separate seat portion, 103, become worn, new seat portion, 103, can be supplied without renewing the entire seat member. Furthermore, in some instances the seat member may be provided with a plurality of groups of plate valve members arranged as herein shown and described, in which case it would be very difficult to provide a suitable seating surface for all the groups on the necessarily large surface of the seat member. By providing a separate hardened seat portion for each group of valves secured to the seat member, which may take in several groups, manufacture is not only facilitated but a worn seat portion, 103, for one group may be readily replaced at slight cost without disturbing the other groups. The other parts illustrated in Fig. 6 not previously referred to are constructed in the same manner as described with reference to Figs. 1 to 5 and 15.

In Figs. 8 to 12 I have illustrated another embodiment of my invention, in which the parts corresponding with those previously described with reference to Figs. 1 to 5 and 15, are given the same reference numerals with the addition of 200, to avoid repetition. In this embodiment of my invention, the independently removable keeper bars are constructed so as to provide not only the means for preventing longitudinal displacement of the plate valve members, but also the lateral displacement thereof. This is accomplished by providing the inner face of each of the keeper bars, 211, one of which is shown in detail in Fig. 10, with vertical recesses, indicated at 211a, separated by projecting portions, indicated at 211b. In this embodiment of my invention the seat member, 201, is shown as provided with longitudinally extending recesses, 204, and each of the keeper bars is provided with a downwardly extending portion, 213, projecting into one of the recesses, 204. The rear vertical wall, 214, of each recess, 211a, in the keeper therefore provides the unbroken abutting surface adjacent to the projecting end of the plate valve member and extending below the level of the seating surface to prevent longitudinal movement thereof, while the unbroken lateral faces, 214a, of the recesses, 211a, in the keeper bars lie on opposite sides of the projecting end portion of the plate valve members, as will be clearly apparent from Figs. 8 and 10, and likewise extend below the level of the seating surface thereby holding the plate valve members against lateral displacement at each end thereof, while permitting the depression of the said projecting end portions of the valve members when flexed into open position without danger of their catching on any of said vertical walls.

Figure 11:
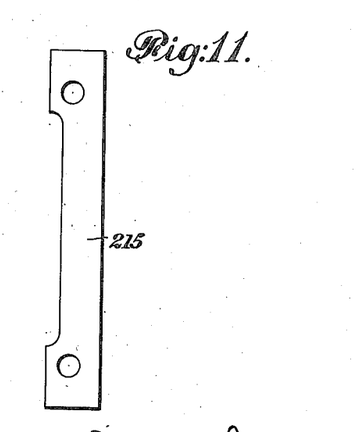
Fig. 11 is a detail view of one of the spacers illustrated in Fig. 9 employed between the keeper and the seat member shown in that figure.

In this embodiment, therefore, I have removed the lateral retaining means for the valve members entirely from the keeper and the curved lower face of the keeper, indicated at 210, may thus be provided as a continuous face extending from a point near one end of the keeper, 206, to a point near the other end of the same, as clearly indicated in the bottom plan view shown in Fig. 12, instead of milling individual recesses above each plate valve member separated by the lateral guiding portions, 6a, as in the construction shown in Figs. 1 to 5 and 15, which facilitates manufacture. In this construction a shim, or spacer, indicated at 215, one of which is shown in detail in Fig. 11, is placed under each of the two end edges of the keeper before it is secured in position with respect to the seat member, the shim or spacer being slightly thicker than the strip valve to provide working clearance therefor.

The construction of the embodiment shown in Figs. 8 to 12, aside from the particulars previously noted, and the operation thereof will be the same as that previously described with reference to Figs. 1 to 5.

In Fig. 13, in which the parts corresponding with those previously described with reference to Figs. 1 to 5 and 15, are given the same reference numerals with the addition of 300, I have illustrated another slightly modified embodiment of my invention. In this figure the seat member, 301, is provided with an entirely smooth upper face upon which is supported the separate hardened seat portion, 303, provided with inlet apertures, 302a, registering with the inlet apertures, 302, in the seat. The keeper, 306, is constructed exactly like the keeper, 206, illustrated in Fig. 12, and the projecting ends of the plate valves, 305, extend into recesses, 311a, in the keeper bar, 311, the upper face of which is in a plane slightly above the normal plane of the upper faces of the plate valve members when in normal or closed position. A supplemental keeper bar, 311x, is superimposed upon the keeper bar, 311, and has its inner edge extending over the recesses, 311a, and the adjacent ends of the strip valve. The bolts, 312, extend through registering apertures in the keeper bar, 311, and supplemental keeper bar, 311x. The function of these recesses, 311a, is, however, exactly the same as that previously described with references to the recesses, 211a (see Figs. 8 and 10) in that they provide the unbroken abutting faces, 314, extending below the plane of the seating surface for preventing the longitudinal displacement of the plate valve members and lateral unbroken vertical faces, 314a likewise extending below the plane of the seating surface, to prevent the lateral displacement of the plate valve members, in the manner previously described.

Fig. 14, in which the parts corresponding with those previously described with reference to Figs. 1 to 5 and 15, are given the same reference numerals with the addition of 400, illustrates another slightly modified construction, substantially identical with that shown in Figs. 8 to 12 inclusive, except that in Fig. 14 the seat member, 401, is provided with the separate seat portion, 403, similar to that illustrated in Figs. 6 and 7. In this construction shown in Fig. 14, the independently mounted keeper bars, 411, are provided with recesses, 411a, which in this instance extend vertically the full depth of the keeper bars and provide the necessary unbroken vertical walls extending below the seating surface for preventing the displacement of the plate valve members longitudinally as well as laterally.

Figure 16:
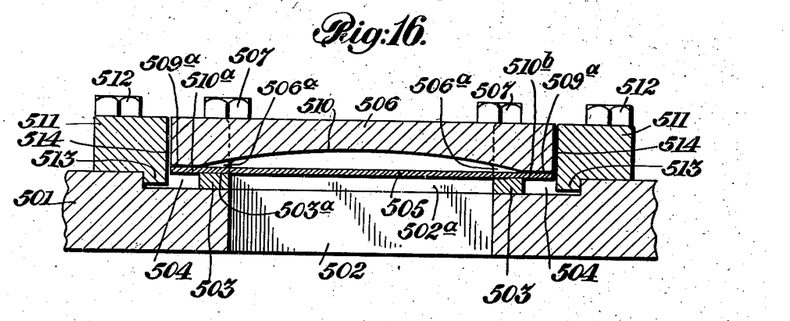
Fig. 16 is a sectional view similar to Fig. 3, showing a separate hardened seat plate.

Fig. 16, in which the parts corresponding with those previously described with reference to Figs. 1 to 5 and 15, inclusive, are given the same reference numerals with the addition of 500, illustrates another slight modification of my invention, in which the parts are constructed exactly as shown in said previously described figures, except that the seating surface 503a, is provided on the upper face of a separate hardened seat plate, 503, detachably secured to the seat member, 501, the seat plate engaging the seat member at the level of the bottoms of recesses, 4.

What I claim and desire to secure by Letters Patent is:

1. In an automatic plate valve mechanism, the combination of a seat member having a flat finished upper face, and provided with passages therethrough, a separate valve seat portion superimposed upon the upper face of said seat member and provided with a valve engaging seating surface above the level of the upper face of the seat member providing spaces below the valve seat face to accommodate the vertical movement of the ends of the plate valve, and having passages registering with the passages in said seat member, a plurality of flexible plate valve members for controlling said passages, said valves having opposite end portions projecting beyond the opposite edges of said seating surface, a keeper rigidly secured with respect to said seat member, and provided with outlet passages, independent keeper bars located at opposite sides of said keeper, rigidly but detachably secured independently of the keeper with respect to the seat member, and each having its inner face provided with vertically disposed recesses, to receive the projecting ends of said valve members, respectively, and hold said valve members against lateral and longitudinal displacement.

2. In an automatic plate valve mechanism, the combination of a seat member having a flat finished upper face, and provided with passages therethrough, a separate valve seat portion superimposed upon the upper face of said seat member and provided with a valve engaging seating surface above the level of the upper face of the seat member providing spaces below the valve seat face to accommodate the vertical movement of the ends of the plate valve, and having passages registering with the passages in said seat member, a plurality of flexible plate valve members for controlling said passages, said valves having opposite end portions projecting beyond the opposite edges of said seating surface, a keeper rigidly secured with respect to said seat member, and provided with outlet passages, and having its inner surface recessed continuously between points adjacent to its ends on a predetermined radius, to provide arched surfaces above said valves to limit the flexing thereof in opening, independent keeper bars located at opposite sides of said keeper, rigidly but detachably secured independently of the keeper with respect to the seat member, and each having its inner face provided with vertically disposed recesses, to receive the projecting ends of said valve members, respectively, and hold said valve members against lateral and longitudinal displacement.

3. In an automatic plate valve mechanism, the combination of a seat member, provided with inlet passages, a separate seat portion, supported upon and projecting above said seat member providing spaces below the valve seat face to accommodate the vertical movement of the ends of the plate valve, and provided with inlet passages registering with those of said seat member, a plurality of flexible plate valve members for controlling said passages, each having end portions projecting beyond the opposite edges of said hardened seat portion, a keeper superimposed upon said separate seat portion, and being of less width than the length of said valve members, securing means for uniting said keeper, seat portion and seat member, keeper bars on opposite sides of the said keeper provided on their inner faces with vertically disposed recesses to engage the projecting ends of said valve members, to prevent the lateral and longitudinal displacement of said valve members and means for securing the keeper bars with respect to the seat member, independently of the keeper.

4. In an automatic plate valve mechanism, the combination of a seat member having a valve engaging seating surface and portions at opposite sides of said seating surface below the plane of said seating surface, providing spaces to accommodate the vertical movement of the ends of the plate valve, a flexible plate valve member having end portions extending beyond the said opposite sides of said seating surface and over said spaces, a keeper secured rigidly in relation to said seat member, provided with an arched portion above said valve member, and means for restrainment adapted to engage the valve member at a distance from each end thereof, keeper bars located adjacent to said opposite sides of the seating surface and having unbroken vertical faces extending into said spaces below the plane of the said seating surface and throughout the range of movement of the ends of the valve in both directions, to limit the endwise movement of the valve during the flexing of the valve, and detachable means independent of the securing means for the keeper, for securing each keeper bar in position, whereby either or both of said keeper bars may be removed without disturbing the keeper to permit removal or insertion of the plate valve.

5. In an automatic plate valve mechanism, the combination of a seat member having a valve engaging seating surface and portions at opposite sides of said seating surface below the plane of said seating surface, providing spaces to accommodate the vertical movement of the ends of the plate valve, a flexible plate valve member having end portions extending beyond the said opposite sides of said seating surface and over said spaces, a keeper secured rigidly in relation to said seat member, provided with an arched portion above said valve member, and means for restrainment adapted to engage the valve member at a distance from each end thereof, keeper bars located adjacent to said opposite sides of the seating surface and having unbroken vertical faces extending into said spaces below the plane of the said seating surface and throughout the range of movement of the ends of the valve in both directions, to limit the endwise movement of the valve during the flexing of the valve, and detachable means independent of the securing means for the keeper, for securing each keeper bar in position, whereby either or both of said keeper bars may be removed without disturbing the keeper to permit removal or insertion of the plate valve, and means for engaging the end portions of said valve on opposite sides thereof to prevent lateral displacement of the valve.

6. In an automatic plate valve mechanism, the combination of a seat member provided with a seating surface, and recesses at opposite sides of said surface extending below the plane of said surface, a flexible plate valve member having end portions extending beyond the said opposite sides of said seating surface and projecting over said recesses, a keeper rigidly secured with respect to said seat member, provided with an arched portion above the valve, and means for restrainment adapted to engage the valve member at a distance from the ends of the valve member, separate keeper bars located at opposite sides of the keeper, each having a part extending into one of said recesses and provided with an unbroken vertical wall, at a distance from the contiguous end of the valve member, and extending throughout the range of movement of said end, and detachable means independent of the securing means for the keeper for securing each keeper bar in fixed relation with the seat member, whereby either or both of said keeper bars can be removed without disturbing the keeper, to permit the longitudinal insertion and removal of the valve.

7. In an automatic plate valve mechanism, the combination of a seat member provided with a seating surface, and recesses at opposite sides of said surface extending below the plane of said surface, a flexible plate valve member having end portions extending beyond the said opposite sides of said seating surface and projecting over said recesses, a keeper rigidly secured with respect to said seat member provided with an arched portion above the valve, guiding portions extending on opposite sides of the end portions of the valve member, and means for restrainment adapted to engage the upper face of the valve member at a distance from each end of the valve member, securing means connecting said keeper with the seat member, separate keeper bars at opposite sides of the keeper each having a part extending into one of said recesses and provided with an unbroken vertical surface at a distance from the contiguous end of said valve member and extending vertically throughout the range of movement of the said end, and detachable securing means for each keeper bar independent of the securing means for the keeper, for connecting it with the seat member, whereby either or both of said keeper bars may be removed without disturbing the keeper to permit the removal or insertion of the valve member.

8. In an automatic plate valve mechanism, the combination of a seat member having a seat portion provided with a valve engaging seating surface having a plurality of apertures therein, said seat portion having at opposite sides of the seating surface, portions below the plane of said seating surface providing spaces to accommodate the vertical movement of the ends of the plate valves, a series of flexible plate valve members engaging said seating surface to control said apertures, and having end portions projecting beyond said surface and into said spaces, a keeper rigidly secured with respect to said seat member, and provided with a substantially continuous arched portion extending over all of said valve members provided with apertures for the passage of fluid, and having means for restrainment of the valve members, adapted to engage the valve members at a distance from each end thereof, keeper bars located on opposite sides of the keeper, each having unbroken vertical walls adjacent to the sides and one end of each valve member, said walls extending into one of said spaces and below the plane of the seating surface and throughout the range of movement of the contiguous ends of the valve members, and means independent of the securing means for the keeper, for securing each of said keeper bars in fixed relation with the said member, whereby either or both of said keeper bars may be removed without disturbing the keeper to permit the removal and replacement of any of the valve members.

9. In an automatic plate valve mechanism, the combination of a seat member having an apertured seat portion provided with a plane, valve engaging seating surface and a recess at each end of said seating surface below the plane of said surface to accommodate the vertical movements of the ends of the valve member away from and toward the plane of the seating surface in the flexing of the valve member, a flexible plate valve member engaging said seating surface and having end portions projecting beyond said surface and over said recesses, a keeper rigidly secured with respect to said seat member, and extending over portions of the valve member between said projecting end portions, and detachable keeper bars mounted independently of said keeper having portions extending into said recesses and each provided with a vertically disposed recess having vertically disposed walls for engaging both sides and the end of the adjacent vertically movable end portion of said flexible valve member, to prevent longitudinal and lateral displacement of said valve member.

LEONARD OCHTMAN, Jr.